Patented July 27, 1943

2,325,529

UNITED STATES PATENT OFFICE 2,325,529

COUGH DROP

Edward C. Merrill, West Roxbury, Mass., assignor to United Drug Company, Boston, Mass., a corporation of Delaware No Drawing. Application July 23, 1941, Serial No. 403,662

6 Claims. (Cl. 167—82)

This invention relates to a cough drop and to a method of making it, and more particularly to a cough drop containing acetyl salicylic acid or aspirin.

Among the objects of this invention are the provision of a cough drop of the type indicated which contains a relatively large proportion of acetyl salicylic acid or aspirin; the provision of a cough drop in which the acetyl salicylic acid content is stable over a substantially indefinite period of time; the provision of a cough drop which supplies a requisite proportion of medication; and the provision of a cough drop of the type indicated which is more easily and economically prepared. Other objects will be in part obvious and in part pointed out hereinafter.

The invention accordingly comprises the ingredients and combinations of ingredients, the proportions thereof, steps and sequence of steps, and features of composition and manipulation, which will be exemplified in the products hereinafter described and the scope of the application of which will be indicated in the following claims.

In my Patent 2,086,386 is disclosed a sugar cough drop containing acetyl salicylic acid and a method of manufacturing such a product. The product therein disclosed is of wide utility and value for the purposes therein outlined. It has been found, however, that only a relatively small proportion of acetyl salicylic acid, usually no more than 1%, can be incorporated into the sugar melt. The present invention provides a method for substantially increasing the proportion of acetyl salicylic acid which can be incorporated into the sugar to provide a cough drop or other medication of this type having a substantially greater concentration of the acetyl salicylic acid.

Sorbitol, a hexahydric alcohol, $C_6H_8(OH)_6$, when heated with acetylsalicylic acid, forms a solution and possesses a greater capacity for solution of acetylsalicylic acid than sugar. Consequently the incorporation of acetylsalicylic acid in a hardy candy mass such as a cough drop or a lozenge can be accomplished by first combining the sorbitol, either the $d$ or $l$ isomer, or a mixture, with acetylsalicylic acid, and adding same to a hot melt of sugar at a temperature of 200° F.–250° F., with the result that the mass softens and becomes more pliable and easily handled, and the medication becomes thoroughly blended and homogeneous.

According to the present invention, acetyl salicylic acid is mixed with a sorbitol. The resulting mixture forms an ointment or paste, rather than a fluffy powder, and accordingly, is more easily incorporated into the sugar, candy mass than acetyl salicylic acid itself.

The candy, sugar base is formed in the usual manner. It may consist, for example, of 75 parts of sucrose and 25 parts of glucose. This mixture is then heated to about 278° F., and the water content is reduced to approximately 1% or less. The soft doughy mass is then mixed in a suitable mixer, of which a Buerk mixer is typical, for a short period of time. During this mixing, the mixture of sorbitol and acetyl salicylic acid is added to the candy mass and mixed therein. The candy should be at a temperature of from about 200° F. to 248° F. during this incorporation. A homogeneous mixture of the ingredients is thereby obtained, probably a combination of a solution and a dispersion of the acetyl salicylic acid and sorbitol in the candy. The mixture is then formed into cough drops or other desired shapes, in the customary manner.

It has been found that a cough drop containing 4% of acetyl salicylic acid by weight can be easily formed by mixing the required amount of acetyl salicylic acid with from an equal amount to a double amount of sorbitol. The resulting ointment or paste is easily incorporated into the candy during the mixing operation, and forms an intimate, homogeneous, clear mixture.

Where a smaller proportion of acetyl salicylic acid is desired in the final mixture, less than an equal proportion of sorbitol may be employed. Where a greater proportion of acetyl salicylic acid is desired in the final mixture, the proportion of sorbital to acetyl salicylic acid should be increased. Since sorbital is hygroscopic, the proportion thereof in the final mixture should not be increased to a point where it renders the final composition objectionally hygroscopic. Where large proportions of sorbitol are employed, part or all of the moisture content thereof should be removed prior to mixture with the acetyl salicylic acid.

The cough drops or other compositions prepared as described above are stable over a substantially indefinite period of time. There is no progressive development of salicylic acid in the drop, but on the contrary, the acetyl salicylic acid apparently remains substantially unchanged.

Other candy bases than that described above may be substituted, and other suitable sugars or combinations of sugars may be employed.

Other medications or desired ingredients may be incorporated into the final mixture for special uses. For example, a medication for irritated and sore throats can be combined or incorporated with the acetyl salicylic acid in the sugar base.

In lieu of acetyl salicylic acid itself, the customarily employed salts, such as the sodium salt, may be substituted therefor.

In view of the above, it will be seen that the several objects of the invention are achieved and other advantageous results attained.

As many changes could be made in the above products without departing from the scope of the invention, it is intended that all matter contained in the above description shall be interpreted as illustrative and not in a limiting sense.

What is claimed is:

1. A solution of acetyl salicylic acid and a sorbitol in a sugar that is substantially free from water.

2. A solution of acetyl salicylic acid and a sorbitol in sucrose that is substantially free from water.

3. A solid solution of acetyl salicylic acid and a sorbitol in a mixture of sucrose and glucose substantially free from water.

4. A solution of acetyl salicylic acid and a sorbitol in a sugar that is substantially free from water, said solution containing in excess of 1% of acetyl salicylic acid.

5. A solution of acetyl salicylic acid and a sorbitol in sucrose that is substantially free from water, said solution containing in excess of 1% of acetyl salicylic acid.

6. A solid solution of acetyl salicylic acid and a sorbitol in a mixture of sucrose and glucose substantially free from water, said solution containing in excess of 1% of acetyl salicylic acid.

EDWARD C. MERRILL.